United States Patent
Sun et al.

(10) Patent No.: US 7,106,542 B1
(45) Date of Patent: Sep. 12, 2006

(54) METHOD AND APPARATUS FOR DETERMINING EMBEDDED RUNOUT CORRECTION VALUES WHEN SELF-SERVO WRITING OR PARTIAL SELF-SERVO WRITING A DISK DRIVE

(75) Inventors: Yu Sun, Fremont, CA (US); Lin Guo, Milpitas, CA (US); Don Brunnett, Pleasanton, CA (US); Georgie Tan, Singapore (SG); John Purkett, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/318,315

(22) Filed: Dec. 11, 2002

Related U.S. Application Data (60) Provisional application No. 60/339,507, filed on Dec. 11, 2001.

(51) Int. Cl.
*G11B 21/02* (2006.01)
(52) U.S. Cl. ..................................... 360/75; 360/77.04
(58) Field of Classification Search ................ 360/75, 360/77.08, 53, 77.09, 48, 51; 369/44.28, 369/44.34
See application file for complete search history.

(56) References Cited

U.S. PATENT DOCUMENTS

| | | | |
|---|---|---|---|
| 4,412,165 A | 10/1983 | Case et al. ................... | 318/636 |
| 6,061,200 A * | 5/2000 | Shepherd et al. ......... | 360/77.04 |
| 6,115,203 A | 9/2000 | Ho et al. .................. | 360/77.04 |
| 6,469,853 B1 * | 10/2002 | Satoh ........................... | 360/48 |
| 6,519,107 B1 * | 2/2003 | Ehrlich et al. ................ | 360/75 |
| 6,522,494 B1 * | 2/2003 | Magee ......................... | 360/75 |
| 6,549,362 B1 * | 4/2003 | Melrose et al. .......... | 360/77.04 |
| 6,714,376 B1 | 3/2004 | Brunnett et al. .............. | 360/75 |

OTHER PUBLICATIONS

Tung, et al., U.S. Appl. No. 10/293,904, filed Nov. 12, 2002, "Method and Apparatus for Partial Self-Servo Writing Using Servo Wedge Propagation".

* cited by examiner

Primary Examiner—K. Wong
(74) Attorney, Agent, or Firm—Tejpal S. Hansra (57) ABSTRACT

A method and apparatus for determining embedded runout correction values when self-servo writing or partial self-servo writing is disclosed. In one embodiment, a disk surface, which has servo information written thereon, is provided. The servo information is grouped into 1x servo sectors and 2x servo sectors, and the 1x servo sectors and the 2x servo sectors form a plurality of tracks. A read head servos on the 1x servo sectors associated with a track. Both position error signals due to repeatable runout for the 1x servo sectors and information related to position error signals due to repeatable runout for the 2x servo sectors are determined, while servoing on the 1x servo sectors. Embedded runout correction values for the 1x servo sectors and the 2x servo sectors are calculated.

32 Claims, 7 Drawing Sheets

METHOD AND APPARATUS FOR DETERMINING EMBEDDED RUNOUT CORRECTION VALUES WHEN SELF-SERVO WRITING OR PARTIAL SELF-SERVO WRITING A DISK DRIVE

CROSS-REFERENCE TO RELATED APPLICATIONS

Priority is claimed from U.S. Provisional Patent Application Ser. No. 60/339,507 filed Dec. 11, 2001, which is incorporated herein by reference in its entirety.

FIELD OF THE INVENTION

The present invention relates to computer disk drives. More particularly, the present invention relates to determining embedded runout correction values when self-servo writing or partial self-servo writing a disk drive.

BACKGROUND OF THE INVENTION

A disk drive is a data storage device that stores digital data in tracks on the surface of a data storage disk. Data is read from or written to a track of the disk using a transducer, which includes a read element and a write element, that is held close to the track while the disk spins about its center at a substantially constant angular velocity. To properly locate the transducer near the desired track during a read or write operation, a closed-loop servo scheme is generally implemented. The servo scheme uses servo data read from the disk surface to align the transducer with the desired track.

Servo data is generally written to the disk using a servo track writer (STW). As is well-known to those skilled in the art, servo data from a prior-written track on the disk surface is not used by the servo track writer in connection with writing servo data for a subsequent track on the disk surface. Instead, the servo track writer uses an external relative encoder to position itself and the disk drive's transducer (through use of one of a variety of push-pin systems) relative to the disk surface in order to write servo data.

There has been a movement towards using the disk drive's transducer to write some portion or, in some cases, all of the servo data, without using an external relative encoder. In such cases, servo data from a prior-written track on the disk surface is used by the disk drive's transducer to write servo data for a subsequent track on the disk surface. For example, techniques have been developed which allow a portion of the servo information to be written through use of a servo track writer and a portion of the servo information to be self-written by the disk drive's transducers. Furthermore, in another technique, the disk drive's transducers may be used to self-write the entirety of the servo information. In a further technique, printed media may be used by the disk drive's transducers to self-write some or all of the disk drive's servo information.

In an ideal disk drive system, the tracks of the data storage disk are written as non-perturbed circles situated about the center of the disk. As such, each of these ideal tracks includes a track centerline that is located at a known constant radius from the disk center. In an actual system, however, it is difficult to write non-perturbed circular tracks to the data storage disk. That is, due to certain problems (e.g., vibration, bearing defects, etc.), tracks are generally written differently from the ideal non-perturbed circular track shape. Positioning errors created by the perturbed nature of the tracks are known as written-in repetitive runout (W_RRO), and also have been known as STW_RRO since tracks have been traditionally written by a servo track writer (STW).

The writing of non-perturbed circular tracks is especially problematic when self-servo writing or partial self-servo writing. That is, when servo data from a prior-written track on the disk surface is used by the disk drive's transducer to write servo data for a subsequent track on the disk surface, the W_RRO may be compounded from track-to-track.

In order to reduce problems associated with W_RRO, disk drive manufacturers have developed techniques to determine the W_RRO, so that compensation values (also known as embedded runout correction values or ERC values) may be generated and used to position the transducer along an ideal track centerline. Examples of techniques used to determine ERC values may be found in U.S. Pat. No. 4,412,165 to Case et al. entitled "Sampled Servo Position Control System," U.S. Pat. No. 6,115,203 to Ho et al. entitled "Efficient Drive-Level Estimation of Written-In Servo Position Error," and U.S. patent application Ser. No. 09/753,969 filed Jan. 2, 2001 entitled "Method and Apparatus for the Enhancement of Embedded Runout Correction in a Disk Drive," all of which are incorporated herein by reference.

Figure 1:
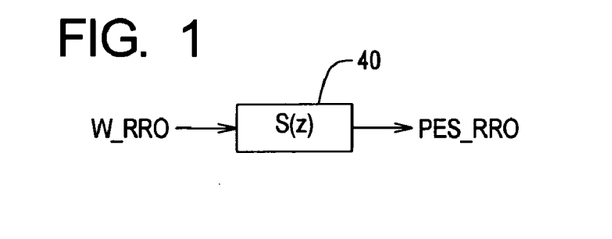
FIG. 1 is a block diagram that depicts the relationship between written-in repetitive runout and position error signal for a particular track.
Figure 2:
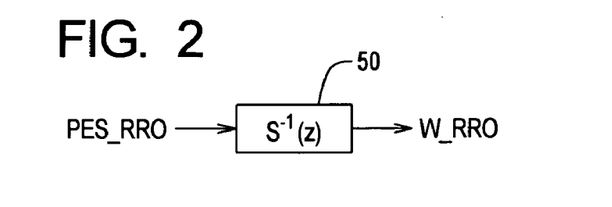
FIG. 2 is a block diagram that depicts the relationship between the position error signal for a particular track and the written-in repetitive runout.

It has been determined that W_RRO is related to a position error signal due to repeatable runout (PES_RRO) by a predetermined transfer function S(z) 40, as illustrated in FIG. 1. The transfer function 40, in general, describes how the servo control system reacts to and follows the perturbed track. That is, W_RRO is the stimulus and PES_RRO is the response. As illustrated in FIG. 2, in order to determine W_RRO values using PES_RRO values, the inverse transfer function $S^{-1}(z)$ 50 must be determined and the PES_RRO values must be convolved therewith.

The inverse transfer function $S^{-1}(z)$ 500 may be determined using a variety of techniques, such as those described in U.S. Pat. No. 6,115,203 to Ho et al. entitled "Efficient Drive-Level Estimation of Written-In Servo Position Error," and U.S. patent application Ser. No. 09/753,969 filed Jan. 2, 2001 entitled "Method and Apparatus for the Enhancement of Embedded Runout Correction in a Disk Drive."

PES_RRO values may be determined by taking position error signal measurements while track following and averaging the position error for each servo sector associated with the track for multiple revolutions of the disk (e.g., 8 revolutions). As will be understood by those skilled in the art, the position error is averaged for multiple revolutions of the disk, so that the affects of non-repeatable runout may be averaged out.

The result of the convolution operation is the W_RRO (see FIG. 2). The W_RRO values associated with each servo sector may then be used to determine compensation values (or embedded runout correction values) for each servo sector of the track. The embedded runout correction values are then written to an embedded runout correction field included as part of the data stored in each of the servo sectors.

During normal operation of the disk drive, the transducer reads the ERC value stored in each servo sector of a desired track. The ERC value is then used to modify the position error signal associated with a servo sector to cancel the offset between the non-ideal track (i.e., the track that was written onto the disk surface) and an ideal track, so that the transducer (approximately) follows the ideal track. For example, the ERC value for a sector may be subtracted from a position error signal value read by the transducer for the sector to obtain a modified position error signal value. The modified position error signal value may then be applied in generating a control signal for operating a voice coil motor to position the transducer.

In the case of self-servo writing or partial self-servo writing, it is especially important that ideal circular tracks are followed. If ideal tracks are not followed, the perturbations from the non-ideal tracks will be compounded as the disk drive's transducer writes additional tracks. Accordingly, when self-servo writing or partial self-servo writing, embedded runout correction values for a track should be determined, so that a transducer can follow (or approximately follow) the path of an ideal track when writing a subsequent track.

There are several types of techniques for self-servo writing or partial self-servo writing. Examples of such techniques can be found in U.S. patent application Ser. No. 09/905,564 filed Jul. 13, 2001 entitled "Partial Servo Write Fill In" and U.S. patent application Ser. No. 10/293,904 filed Nov. 12, 2002 entitled "Method and Apparatus for Partial Self-Servo Writing Using Servo Wedge Propagation," which are incorporated herein by reference in their entireties.

In one example of a partial self-servo writing technique, the STW is used to write a portion of the servo information and the disk drive's transducer is used to write the remaining servo information. More specifically, the STW is used to write complete servo information for a track or a group of tracks near the outer diameter of a disk surface. Additional tracks are written by reading the servo information from a complete track using the read element of the transducer associated with the disk surface and by writing servo information using the write element of the transducer for a track closer towards the inner diameter of the disk surface.

Figure 3:
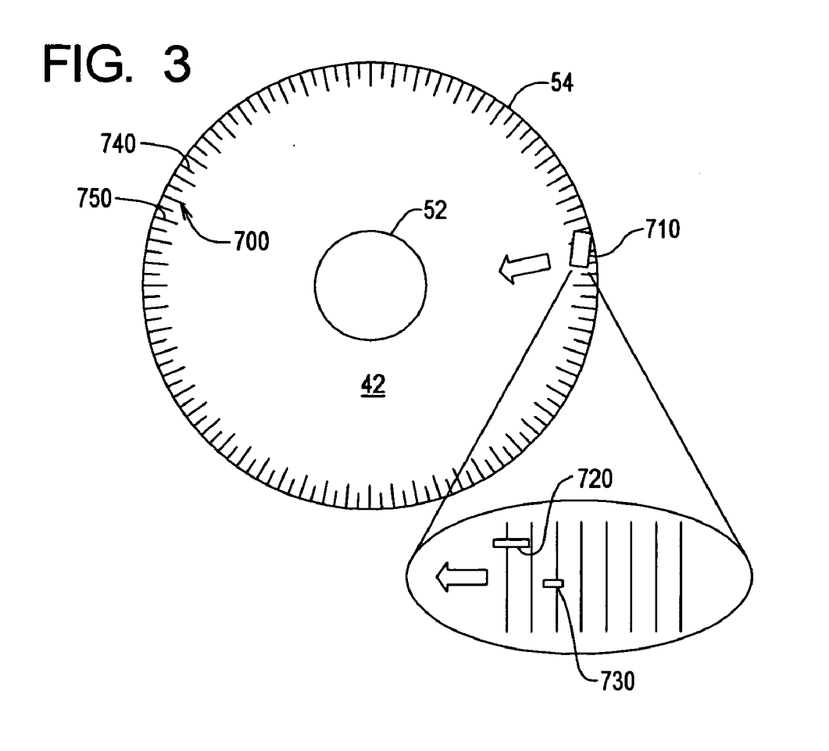
FIG. 3 is a diagrammatic representation of a disk surface having initial portions of servo information written at an outer diameter of the disk surface, along with a magnified representation of an air-bearing surface view of a slider having a writer radially offset from a reader.

Reference is now made to FIG. 3, which illustrates initial portions of servo information 700 that have been written by a servo track writer near the outer diameter 54 of a disk surface 42. This servo information is used by the disk drive to write the remaining portions of the servo information onto the disk surface 42.

In order to write the remaining portions of the servo information onto the disk surface 42, the initial portions of the servo information are read and additional portions of the servo information are written adjacent to the initial portions of the servo information, so that servo information is "filled-in" towards the inner diameter 52 of the disk surface. The additional portions of the servo information are used to write further portions of the servo information that are located further towards the inner diameter of the disk surface, until the remaining portions of the servo information have been completed.

FIG. 3 also shows a magnified air-bearing surface view of a slider 710 having a writer (or write head 720) and a reader (or read head 730). The initial portions of servo information 700 are read by read head 730 and additional portions of the servo information are written by the write head 720. In order to write the additional portions of servo information towards the inner diameter 52 of the disk surface 42, the write head 720 must be offset towards the center of the disk (i.e., in the radial direction) relative to the read head, as shown in the magnified portion of FIG. 3.

Due to limitations of a disk drive's channel, it is impossible to read and write at the same time. Accordingly, groupings of the servo information may be formed. For example, circumferentially-adjacent servo information can be considered to be in differing groups. In FIG. 3, two groups of servo information are shown. For convenience sake, one group of servo information is termed 1x servo sectors 740 (shown as the smaller hash marks that extend toward the center of the disk in FIG. 3) and the other group of servo information is termed 2x servo sectors 750 (shown as the longer hash marks that extend toward the center of the disk in FIG. 3).

Portions of the 1x servo sectors 740 are read by the reader and used to write portions of the 2x servo sectors 750. Then, portions of the 2x servo sectors 750 are read by the reader and used to write portions of the 1x servo sectors 740. Reference is made to FIGS. 4–7 to illustrate this concept.

Figure 4:
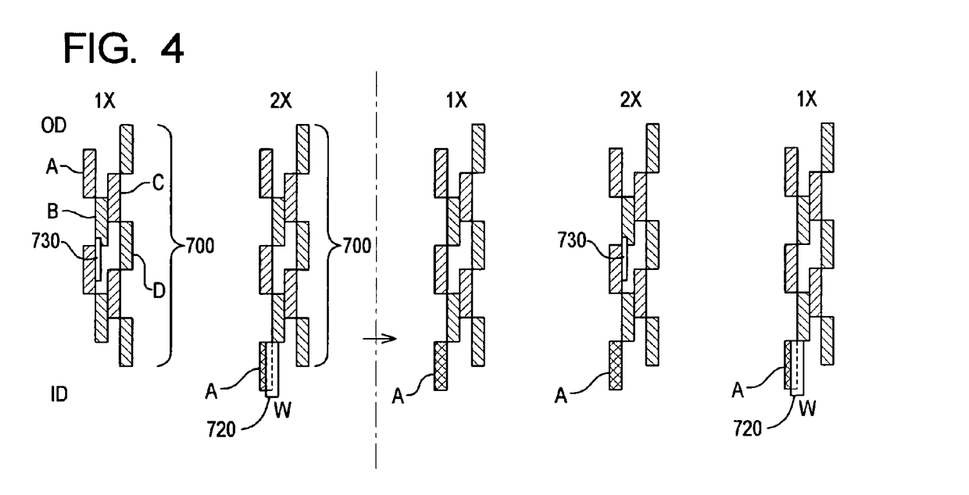
FIGS. 4–7 illustrate a process of writing remaining portions of servo information from the initial portions of servo information.

With reference to FIG. 4, initial portions of servo information 700 include repeating sets of A, B, C and D servo bursts, as is well-known in the art. The initial portions of servo information 700 are shown with a first type of cross-hatching in FIG. 4. The read head 730 is positioned over the 1x servo sectors on the left side of the figure using the 1x set of servo sectors (i.e., a servo operation is performed), so that the write head 720 may be used to write the next burst in the 2x servo sector, which is shown with a second type of cross-hatching on the left side of the figure and is an A servo burst. Generally, 1x servo sectors that are circumferentially-adjacent to 2x servo sectors (and visa-versa) are used to write the next burst.

Once the next servo burst (in the case of FIG. 4 the A servo burst) has been written to the 2x servo sector by performing a servo operation on the 1x servo sector, then a servo operation is performed on the 2x servo sector to write the next servo burst for the 1x servo sector. For example, the read head 730 is positioned over the 2x servo sector on the right side of FIG. 4 using the 2x set of servo sectors (i.e., a servo operation is performed), so that the write head 720 may be used to write the next burst in the 1x servo sector, which is shown with the second type of cross-hatching on the right side of the figure and is an A servo burst.

Figure 5:
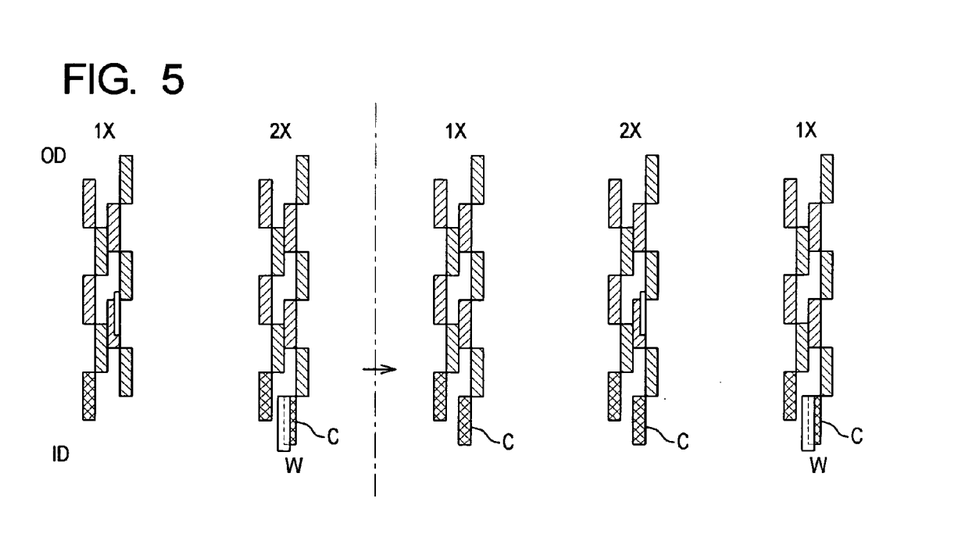
Figure 6:
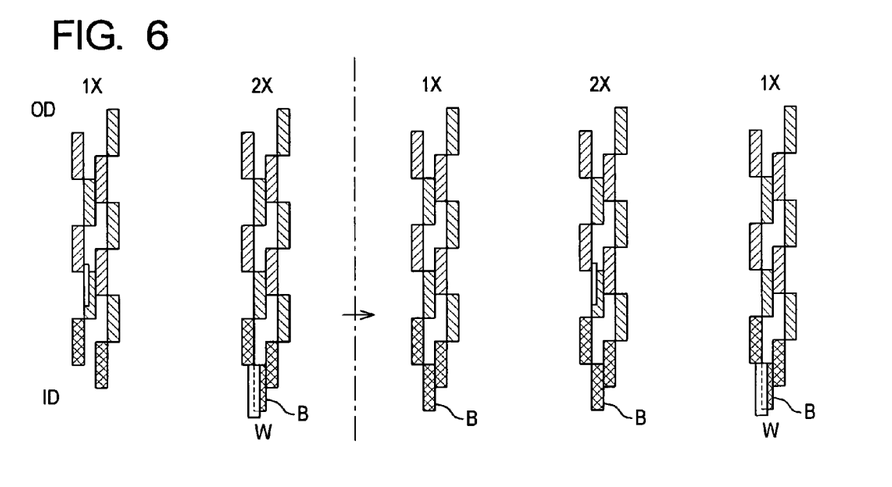
Figure 7:
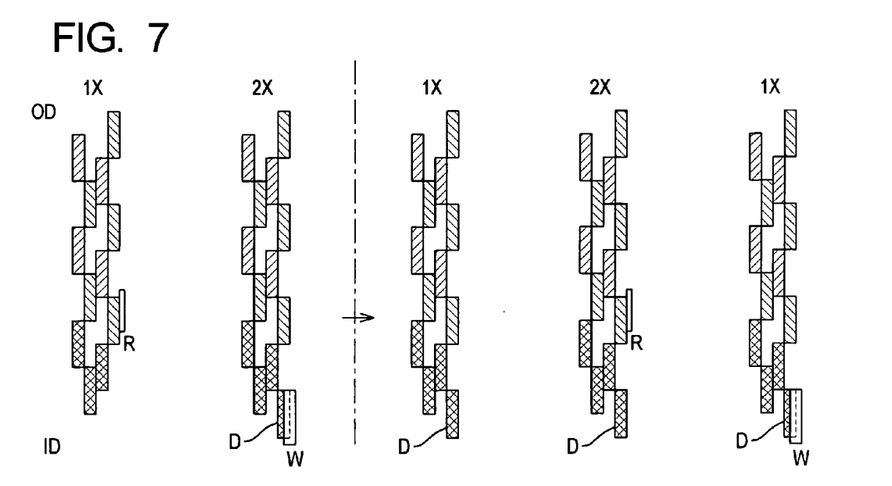

The manner of writing additional bursts, similar to that described in connection with FIG. 4, is shown in FIGS. 5–7. Specifically, C bursts are written in FIG. 5, while B and D bursts are written in FIGS. 6 and 7, respectively.

In order to reduce the likelihood of compounding errors, separate embedded runout correction values must be determined for the 1x servo sectors and the 2x servo sectors. Therefore, PES_RRO measurements have been obtained separately for the 1x servo sectors and the 2x servo sectors. Accordingly, for example, the PES_RRO for the 1x servo sectors is obtained by track following and averaging the position error from each of the 1x servo sectors associated with the track being corrected for multiple revolutions of the disk (e.g., 8 revolutions). Then, the PES_RRO for the 2x servo sectors is obtained by track following and averaging the position error from each of the 2x servo sectors associated with the track being corrected for multiple revolutions of the disk (e.g., 8 revolutions).

Figure 8:
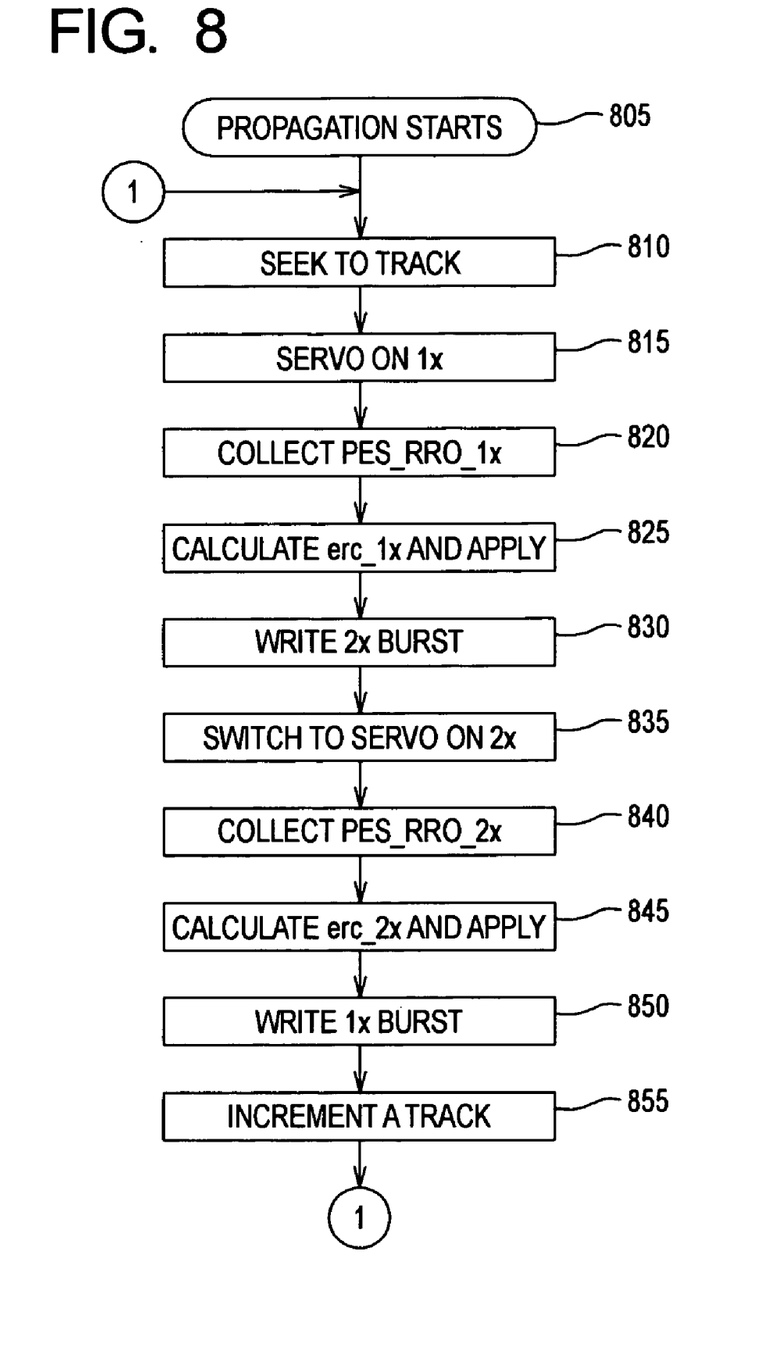
FIG. 8 is a flowchart illustrating a technique for determining and removing written-in repetitive runout in connection self-servo writing or partial self-servo writing a disk drive.

One example of determining and removing the W_RRO for 1x servo sectors and 2x servo sectors, in connection with self-servo writing or partial self-servo writing, is illustrated in the flowchart of FIG. 8. In step 805, the process of self-servo writing (i.e., track propagation) starts. In step 810, the read head seeks to a track, which eventually will be followed by the read head when the disk drive's write head writes additional servo information. In step 815, the read head servos on the 1x servo sectors associated with the track. The PES_RRO values for the 1x servo sectors for the track are obtained (step 820) by track following and averaging the position error from each of the 1x servo sectors associated with the track being corrected for multiple revolutions of the disk (e.g., 8 revolutions). Then, in step 825, the embedded runout correction values are calculated and applied for the 1x servo sectors associated with the track by convolving the PES_RRO values for the 1x servo sectors and the inverse transfer function. Then, the 1x servo sectors (which now more closely follow an ideal circular track) are used to write 2x servo bursts using the disk drive's write head (step 830).

At step 835, the read head then switches such that it begins servoing on the 2x servo sectors for the track. The PES_RRO values for the 2x servo sectors for the track are obtained (step 840) by track following and averaging the position error from each of the 2x servo sectors associated with the track being corrected for multiple revolutions of the disk (e.g., 8 revolutions). Then, in step 845, the embedded runout correction values are calculated and applied for the 2x servo sectors by convolving the PES_RRO values for the 2x sectors with the inverse transfer function. The ERC values for the 2x servo sectors are used in conjunction with the 2x servo sectors to write 1x servo bursts using the disk drive's write head (step 850). The disk drive system then moves to the next track (step 855), and repeats the process set forth in steps 810–855, until all of the tracks have been written by the propagation technique.

Obviously, because a certain number of revolutions (e.g., a total of 16 revolutions in the above example) of the disk to are required to compensate for the W_RRO associated with the 1x servo sectors and the 2x servo sectors, the propagation process can be extremely time-consuming, thereby reducing manufacturing throughput. In addition, since self-servo writing or partial self-servo writing is generally performed in test racks, increased manufacturing times require a further capital expense, in that more test racks must be purchased.

Therefore, it would be desirable to develop a less time-consuming technique for correcting the W_RRO of the 1x servo sectors and the 2x servo sectors used in self-servo writing or partial self-servo writing, so that manufacturing throughput can be increased. More specifically, it would be beneficial to provide a technique for compensating for the W_RRO that requires less revolutions than the prior technique.

SUMMARY OF THE INVENTION

The present invention is designed to meet the aforementioned, and other, needs. The invention is directed to a method and apparatus for determining embedded runout correction values when self-servo writing or partial self-servo writing a disk drive.

In one embodiment, a disk surface, which has servo information written thereon, is provided. The servo information is grouped into 1x servo sectors and 2x servo sectors, and the 1x servo sectors and the 2x servo sectors form a plurality of tracks. A read head servos on the 1x servo sectors associated with a track. Both position error signals due to repeatable runout for the 1x servo sectors and information related to position error signals due to repeatable runout for the 2x servo sectors are determined, while servoing on the 1x servo sectors. Embedded runout correction values for the 1x servo sectors are calculated using the position error signals due to repeatable runout for the 1x servo sectors. Embedded runout correction values for the 2x servo sectors are calculated using the information related to the position error signals due to repeatable runout for the 2x servo sectors.

Other embodiments, objects, features and advantages of the invention will be apparent from the following specification taken in conjunction with the following drawings.

DETAILED DESCRIPTION OF THE PREFERRED EMBODIMENT

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The present invention is directed to method and apparatus for determining embedded runout correction values when self-servo writing or partial self-servo writing a disk drive. More specifically, the present invention includes a technique of determining embedded runout correction values for 1x servo sectors and 2x servo sectors in a more efficient manner than prior techniques. That is, the number of revolutions of the disk surface required to obtain embedded runout correction values for 1x servo sectors and 2x servo sectors is halved as compared to the prior technique described in connection with FIG. 8.

Figure 9:
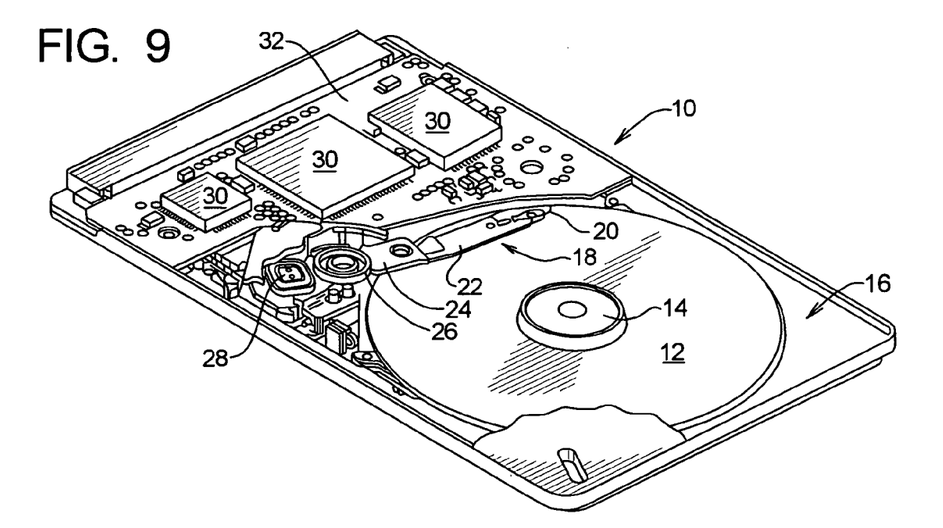
FIG. 9 diagrammatic representation illustrating a disk drive with which the present invention may be used.

FIG. 9 illustrates a disk drive, generally designated 10, with which the present invention may be used. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 (having a write head and a read head) mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 may include a plurality of disks 12 and, therefore, a plurality of corresponding actuator arm assemblies 18. However, it is also possible for the disk drive 10 to include a single disk 12 as shown in FIG. 9.

Figure 10:
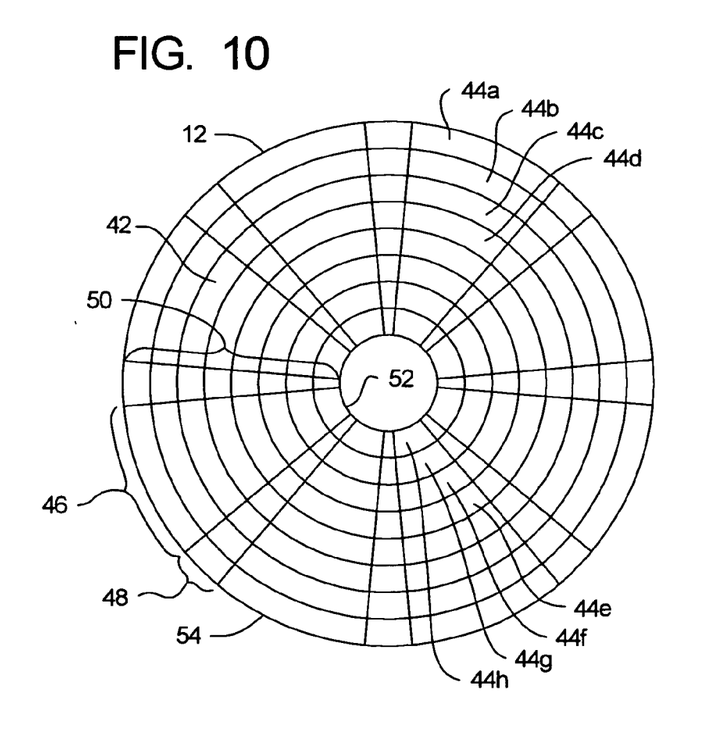
FIG. 10 is a diagrammatic representation of a top view of a magnetic storage disk illustrating a typical organization of data on the surface of the disk.

FIG. 10 is a simplified diagrammatic representation of a top view of a disk 12 having a surface 42 which has been completely formatted to be used in conjunction with a sectored servo system (also known as an embedded servo system). As illustrated in FIG. 10, the disk 12 includes a plurality of concentric tracks 44a–44h for storing data on the disk's surface 42. Although FIG. 10 only shows a relatively small number of tracks (i.e., 8) for ease of illustration, it should be appreciated that typically tens of thousands of tracks are included on the surface 42 of a disk 12.

Each track 44a–44h is divided into a plurality of data sectors 46 and a plurality of servo sectors 48. The servo sectors 48 in each track are radially aligned with servo sectors 48 in the other tracks, thereby forming servo wedges 50 which extend radially across the disk 12 (e.g., from the disk's inner diameter 52 to its outer diameter 54).

Instead of writing all of the radially-aligned servo information which forms servo wedges 50 using a servo track writer, self-servo writing and partial self-servo writing techniques have been developed in an effort to format a disk surface, without using a servo track writer or, at least, while reducing the amount of time required by the servo track writer. Accordingly, self-servo writing or partial self-servo writing techniques are used in an attempt to obtain a disk surface formatted similar to the disk surface 42 shown in FIG. 10.

Figure 11:
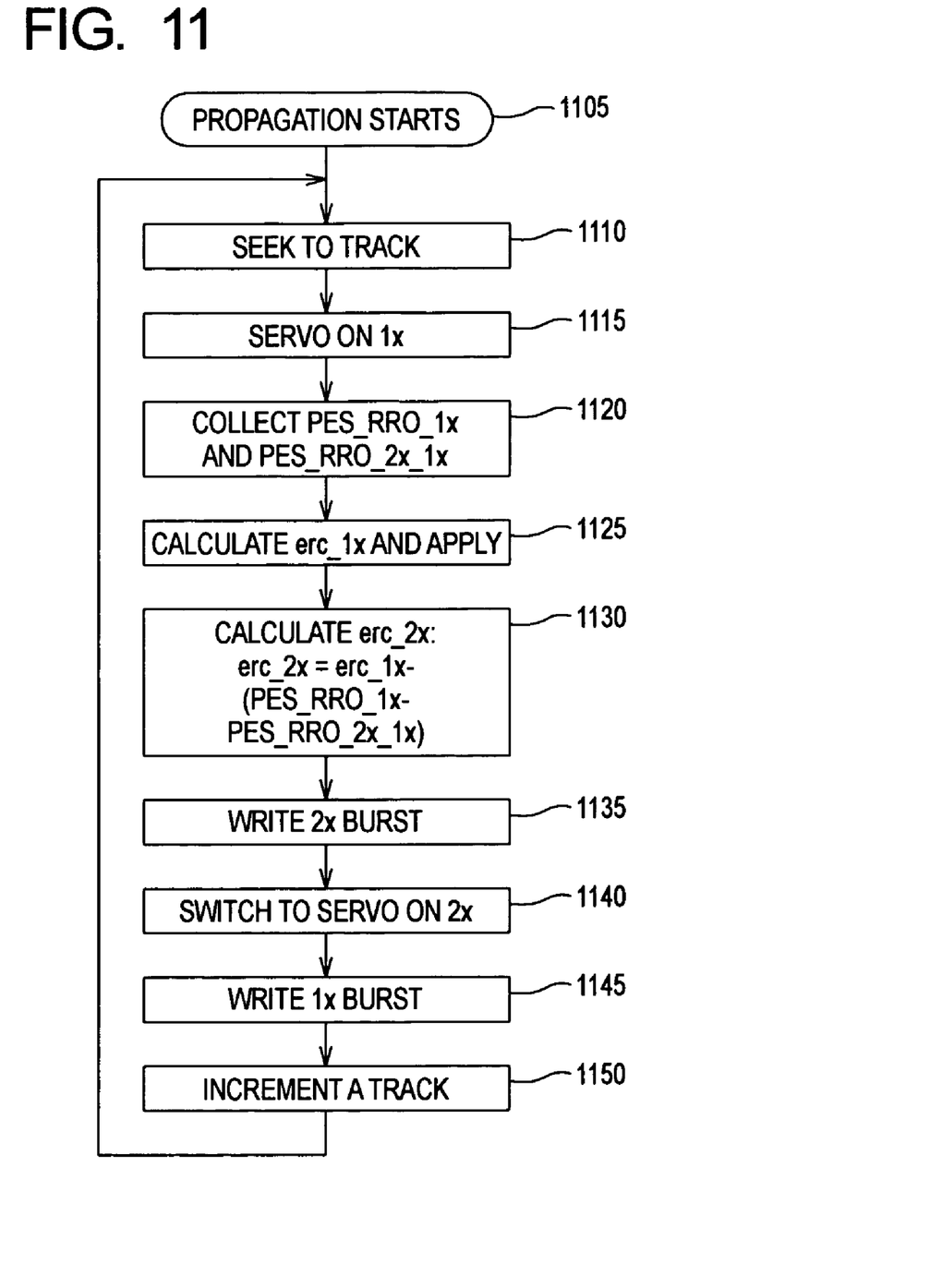
FIG. 11 is a flowchart illustrating a technique for determining and removing written-in repetitive runout in connection with self-servo writing or partial self-servo writing a disk drive, in accordance with one embodiment of the present invention; and, FIG. 12 is a flowchart illustrating a technique for determining and removing written-in repetitive runout in connection with self-servo writing or partial self-servo writing a disk drive, in accordance with another embodiment of the present invention.

Reference is now made to FIG. 11, which illustrates an embodiment of the present invention. In block 1105, the process of self-servo writing (i.e., track propagation) starts. In preparation for writing additional tracks, the read head seeks to a track, which it will follow while the write head writes additional servo information (step 1110).

In step 1115, the read head servos on the 1x servo information. PES_RRO values for the 1x servo sectors associated with the track are obtained (step 1120) by track following and averaging the position error from each of the 1x servo sectors for multiple revolutions of the disk (e.g., 8 revolutions). In concurrent revolutions (e.g., the same 8 revolutions), information related to the PES_RRO values for the 2x servo sectors is obtained. In obtaining such information, however, the read head does not track follow on the 2x servo sectors. Instead, the information related to the PES_RRO values for the 2x servo sectors is obtained while servoing on the 1x servo sectors (hence, the term PES_RRO_2x_1x in FIG. 11).

Then, in step 1125, the embedded runout correction values are calculated and applied for the 1x servo sectors associated with the track by convolving the PES_RRO values for the 1x servo sectors with the inverse transfer function of the system. Furthermore, in step 1130, the embedded runout correction values are calculated and applied for the 2x servo sectors.

Importantly, the inventors have determined that the embedded runout correction values for the 2x servo sectors can be determined using a mathematical relationship. That is, erc_2x=erc_1x–(PES_RRO_1x–PES_RRO_2x_1x).

Next, as set forth in step 1135, using the calculated embedded runout correction values for the 1x servo sectors, the 1x servo sectors are used to write 2x servo information at a location over which the write head is positioned. At step 1140, the read head then switches such that it begins servoing on the 2x servo sectors. Then, without the drive having to expend any additional revolutions, the calculated embedded runout correction values for the 2x servo sectors for the track are used in conjunction with the 2x servo sectors to write 1x servo information using the disk drive's write head (step 1145). The disk drive system then moves to a next track (step 1150) and repeats the process set forth in steps 1110–1150, until all of the tracks have been written by the propagation technique.

Again, as compared to the prior technique described in connection with FIG. 8, the present invention saves the step of using valuable disk drive revolutions to separately collect PES_RRO values for the 2x servo sectors and PES_RRO values for the 1x servo sectors. Accordingly, only the half of the number of revolutions are required for determining the embedded runout correction values for both the 1x and 2x servo bursts for the track, as compared to the prior technique shown in FIG. 8. Therefore, a substantial reduction in time is obtained when propagating tracks on the disk surface, especially since there can be tens of thousands of tracks on a disk surface.

An improvement in calculating the embedded runout correction values for the 2x servo sectors for the track may be obtained by accounting for the half-period delay between the 1x servo sectors and the 2x servo sectors (since the 1x servo sectors and 2x servo sectors are equally-spaced about the disk surface). That is, there is a half-period delay between the time for measuring 2x servo sectors while servoing on the 1x servo sectors, as compared to measuring the 2x servo sectors while servoing on the 2x servo sectors (see, e.g., FIG. 3). The improvement is described in connection with FIG. 12, which illustrates a flowchart of another embodiment of the present invention.

Figure 12:
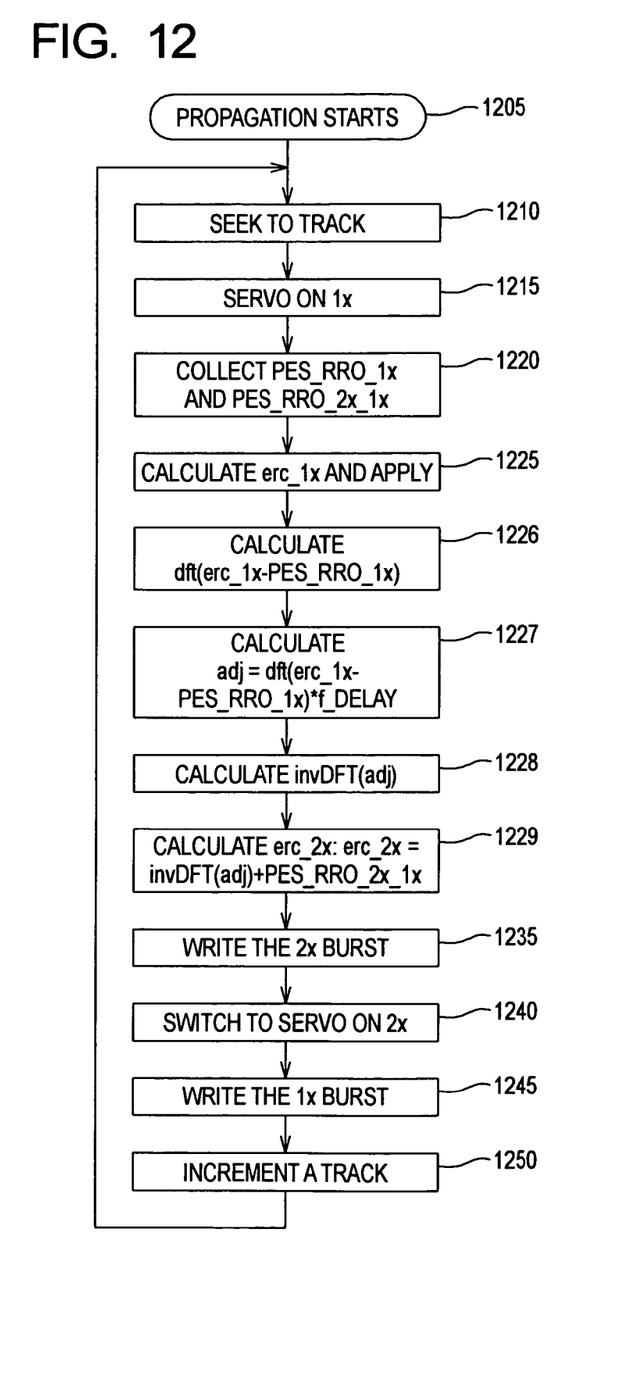

Steps 1205–1225 in FIG. 12 are identical to steps 1105–1125 in FIG. 11. Likewise, steps 1235–1250 in FIG. 12 are identical to steps 1135–1150 in FIG. 11. The difference between the embodiment shown in FIG. 12 and the embodiment shown in FIG. 11 is in the calculation of the embedded runout correction values for the 2x servo sectors.

Specifically, in the embodiment of FIG. 12, the Discrete Fourier Transform is taken of the difference between the embedded runout correction values for the 1x servo sectors for the track and the PES_RRO values for the 1x servo sectors (step 1226). The Discrete Fourier Transform is taken in order to bring the values from the time domain into the frequency domain, so that calculations are made easier.

Next, in step 1227, the adjustment values (adj) are calculated by multiplying the frequency delay with the quantity calculated in step 1226. The inverse Discrete Fourier Transform of the adjustment values (adj) are calculated (step 1228) in order to bring such values back into the time domain. Finally, in step 1129, the embedded runout correction values for the 2x servo sectors are calculated by adding the quantity obtained in step 1228 to the information related to the PES_RRO values for the 2x servo sectors that was obtained in step 1220 while servoing on the 1x servo sectors (PES_RRO_2x_1x).

The present invention may be implemented in the firmware of the controller or any other convenient place in the disk drive. In addition, the present invention may be implemented in a computer external to the disk drive.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
providing a disk surface having servo information written thereon, wherein the servo information is grouped into 1x servo sectors and 2x servo sectors and wherein the 1x servo sectors and the 2x servo sectors form a plurality of tracks;
providing a read head and a write head associated with the disk surface;
servoing on the 1x servo sectors associated with a track;
determining position error signals due to repeatable runout for the 1x servo sectors, while servoing on the 1x servo sectors associated with the track;
determining information related to position error signals due to repeatable runout for the 2x servo sectors, while servoing on the 1x servo sectors associated with the track; and,
calculating embedded runout correction values for the 2x servo sectors associated with the track using the information related to the position error signals due to repeatable runout for the 2x servo sectors, wherein the embedded runout correction values for the 2x servo sectors associated with the track are given by the following formula:

$$erc\_2x = erc\_1x - (PES\_RRO\_1x - PES\_RRO\_2x\_1x)$$

where erc__1x represents the embedded runout correction values for the 1x servo sectors associated with the track, PES_RRO__1x represents the position error signals due to repeatable runout for the 1x servo sectors associated with the track, and PES_RRO__2x__1x represents information related to the position error signals due to repeatable runout for the 2x servo sectors associated with the track.

2. The method of claim 1, further comprising the step of:
calculating embedded runout correction values for the 1x servo sectors associated with the track using the position error signals due to repeatable runout for the 1x servo sectors.

3. The method of claim 2, further including the step of writing servo information that is radially-aligned with the 2x servo sectors using embedded runout correction values calculated for the 1x servo sectors.

4. The method of claim 1, further including the steps of:
servoing on the 2x servo bursts associated with the track; and,
writing servo information that is radially-aligned with the 2x servo sector using embedded runout correction values calculated for the 2x servo sectors.

5. A method comprising the steps of:
providing a disk surface having servo information written thereon, wherein the servo information is grouped into 1x servo sectors and 2x servo sectors, wherein the 1x servo sectors and the 2x servo sectors alternate in a circumferential direction about the disk surface; and,
while servoing on the 1x servo sectors for a track but not the 2x servo sectors for the track, determining both embedded runout correction values for the 1x servo sectors for the track and embedded runout correction values for the 2x servo sectors for the track.

6. The method of claim 5 further including the step of:
using the embedded runout correction values for the 1x servo sectors for the track to write a servo burst to the 2x servo sectors.

7. The method of claim 6, wherein the servo burst written to the 2x servo sectors is written to a different track.

8. The method of claim 6, further including the steps of:
servoing on the 2x servo sectors, but not the 1x servo sectors;
using the embedded runout correction values for the 2x servo sectors for the track to write a servo burst to the 1x servo sectors.

9. The method of claim 8, wherein the servo burst written to the 1x servo sectors is written to a different track.

10. The method of claim 5, further including the steps of:
servoing on the 2x servo sectors, but not the 1x servo sectors;
using the embedded runout correction values for the 2x servo sectors to write a servo burst to the 1x servo sectors.

11. The method of claim 10, wherein the servo burst written to the 1x servo sectors is written to a different track.

12. The method of claim 5, wherein a delay exists between servoing on the 1x servo sectors to determine embedded runout correction values for the 2x servo sectors as compared to servoing on the 2x servo sectors to determine embedded runout correction values for the 2x servo sectors.

13. The method of claim 12, wherein an adjustment value is determined in order to account for the delay when calculating the embedded runout correction values for the 2x servo bursts.

14. The method of claim 12, wherein the delay is a half-period delay.

15. The method of claim 13, wherein the adjustment value is determined using a Discrete Fourier Transform.

16. The method of claim 13, wherein the adjustment value is determined using an inverse Discrete Fourier Transform.

17. The method of claim 12, wherein a Discrete Fourier Transform is taken of a difference between embedded runout correction values for the 1x servo sectors for the track and PES_RRO values for the 1x servo sectors for the track to achieve a first result.

18. The method of claim 17, wherein the first result is multiplied by a value associated with the delay to achieve a second result.

19. The method of claim 18, including the step of:
taking an inverse Discrete Fourier Transform of the second result to achieve a third result.

20. The method of claim 19, further including:
determining adjusted embedded runout correction values for the 2x servo sectors to account for the delay by adding the third result to position error signal values associated with the 2x servo sectors which are obtained while servoing on the 1x servo sectors.

21. A method comprising the steps of:
providing a disk surface having servo information written thereon, wherein the servo information is grouped into 1x servo sectors and 2x servo sectors, wherein 1x servo sectors for a track have a first repeatable runout and wherein 2x servo sectors for the track have a second repeatable runout, wherein the 1x servo sectors and the 2x servo sectors alternate in a circumferential direction about the disk surface;

determining embedded correction values to compensate for the second repeatable runout without servoing on the 2x servo sectors.

22. The method of claim 21, wherein the embedded runout correction values are determined by servoing on the 1x servo sectors.

23. The method of claim 22, wherein the embedded runout correction values to compensate for the second repeatable runout are given by the following formula:

$$erc\_2x = erc\_1x - (PES\_RRO\_1x - PES\_RRO\_2x\_1x)$$

where erc__1x represents the embedded runout correction values for the 1x servo sectors associated with the track, PES_RRO__1x represents position error signals due to repeatable runout for the 1x servo sectors associated with the track, and PES_RRO__2x__1x represents information related to position error signals due to repeatable runout for the 2x servo sectors associated with the track.

24. The method of claim 22, wherein a delay exists between servoing on the 1x servo sectors to determine embedded runout correction values for compensating for the second repeatable runout as compared to servoing on the 2x servo sectors to determine embedded runout correction values for compensating for the second repeatable runout.

25. The method of claim 24, wherein an adjustment value is determined in order to account for the delay when calculating the embedded runout correction values for compensating for the second repeatable runout.

26. The method of claim 24, wherein the delay is a half-period delay.

27. The method of claim 25, wherein the adjustment value is determined using a Discrete Fourier Transform.

28. The method of claim 25, wherein the adjustment value is determined using an inverse Discrete Fourier Transform.

29. The method of claim 24, wherein a Discrete Fourier Transform is taken of a difference between embedded runout correction values for the 1x servo sectors for the track and PES_RRO values for the 1x servo sectors for the track to achieve a first result.

30. The method of claim 29, wherein the first result is multiplied by a value associated with the delay to achieve a second result.

31. The method of claim 30 including the step of:
taking an inverse Discrete Fourier Transform of the second result to achieve a third result.

32. The method of claim 31, further including:
determining adjusted embedded runout correction values for the 2x servo sectors to account for the delay by adding the third result to position error signal values associated with the 2x servo sectors which are obtained while servoing on the 1x servo sectors.

* * * * *